United States Patent
Hahm et al.

(10) Patent No.: US 7,242,756 B2
(45) Date of Patent: *Jul. 10, 2007

(54) METHOD FOR PROVIDING SUBSCRIBER-BASED RINGBACK TONE IN FLEXIBLE PAGING MODE

(75) Inventors: Hee Hyeok Hahm, Seoul (KR); Ki Mun Kim, Incheon-si (KR); Sang Yun Lee, Seongnam (KR); Yeong Tee No, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/523,792

(22) PCT Filed: Aug. 4, 2003

(86) PCT No.: PCT/KR03/01564

§ 371 (c)(1),
(2), (4) Date: Jul. 26, 2005

(87) PCT Pub. No.: WO2004/016029

PCT Pub. Date: Feb. 19, 2004

(65) Prior Publication Data
US 2006/0008068 A1 Jan. 12, 2006

(30) Foreign Application Priority Data
Aug. 9, 2002 (KR) ................... 10-2002-0047213

(51) Int. Cl.
*H04M 3/42* (2006.01)
*H04M 1/00* (2006.01)
(52) U.S. Cl. .................. 379/207.16; 379/374.01
(58) Field of Classification Search .......... 379/207.16, 379/372, 374.01, 386, 418; 455/414.2, 414.3
See application file for complete search history.

(56) References Cited

U.S. PATENT DOCUMENTS

| 5,926,537 | A | 7/1999 | Birze |
| 6,574,335 | B1 * | 6/2003 | Kalmanek et al. .......... 379/386 |
| 7,006,622 | B2 * | 2/2006 | Laine .................... 379/374.01 |

FOREIGN PATENT DOCUMENTS

| JP | 2000-050347 | 2/2000 |
| JP | 2001-106685 | 4/2001 |
| KR | 2000-000244 | 1/2000 |
| KR | 2000-030035 | 6/2000 |
| KR | 2000-055316 | 9/2000 |
| KR | 2001-108937 | 12/2001 |
| KR | 2002-039501 | 5/2002 |
| WO | WO 00/42763 | 7/2000 |

* cited by examiner

*Primary Examiner*—Bing Q. Bui
(74) *Attorney, Agent, or Firm*—Lowe Hauptman & Berner LLP

(57) ABSTRACT

The present invention provides a caller with an arbitrary sound chosen by a called subscriber instead of a conventional RBT (RingBack Tone) without fails even in a flexible paging mode. In the present method: both exchangers check individually whether first information on replacing RBT or not and second information informing a route to a sound providing means have been stored for a called terminal, when an originating exchanger requests a trunk connection to said both exchangers according to a flexible paging procedure, and receive the first and the second information from a home location register after requesting if said information has not been stored, and request individually a trunk connection to the sound providing means while furnishing information identifying the called, based on the already-stored or the received first and the second information; and the originating exchanger selects one of the two paths connected to said both exchangers, and delivers to a caller an RBT replacing sound determined by the sound providing means that is received through the selected path.

16 Claims, 9 Drawing Sheets

FIG. 9

| Parameter=CallingFeaturesIndicator2 | | | | | | | | Length=V | Tag=H'9fff7d |
|---|---|---|---|---|---|---|---|---|---|
| Contents | | | | | | | | meaning | |
| H | G | F | E | D | C | B | A | Octet | Notes |
| VMSB | | VMSU | | MC | | CC | | 1 | |
| FMSNA | | FMSB | | FMSU | | VMSNA | | 2 | a |
| SRBT | | NCW | | Prefer_Sys | | MUDN | | 3 | |
| ........... | | | | | | | | n | |

*defined 'reserve' field before*

METHOD FOR PROVIDING SUBSCRIBER-BASED RINGBACK TONE IN FLEXIBLE PAGING MODE

CROSS REFERENCE TO RELATED APPLICATION

This application is the National Phase application of International Application No. PCT/KR2003/001564, filed Aug. 4, 2003, which designates the United States and was published in English. This application, in its entirety, is incorporated herein by reference.

1. TECHNICAL FIELD

The present invention relates to method for providing an arbitrary sound chosen by a called subscriber for a calling subscriber instead of a conventional ringback tone without fails even in case that a flexible paging is conducted.

2. BACKGROUND ART

When a subscriber calls another through a mobile communication network, a terminating exchanger on the network provides the caller with a uniform ringback tone.

Since the ringback tone is same all the time, a caller can not identify a called before the called answers. Furthermore, the uniform ringback tone can not satisfy various subscribers' needs to reveal their individuality.

By the way, various ad methods are being proposed in these days. One of these ad methods is to send an ad sound message to a caller instead of a conventional ringback tone. However, such an ad sound message is chosen unilaterally by a network operating enterprise. If a caller heard such a unilateral ad sound he or she could talk over a mobile telephone with a called for a limited time.

However, the method that an ad sound is provided instead of a conventional common ringback tone still has the aforementioned drawbacks. That is, a caller can not identify a called before the called answers and the uniform ringback tone cannot satisfy various subscribers' needs to reveal their individuality.

3. DISCLOSURE OF INVENTION

It is an object of the present invention to provide a method for furnishing a caller with an arbitrary sound chosen or registered by a called subscriber instead of a conventional RBT (RingBack Tone). In the present method, an arbitrary RBT-replacing sound chosen or registered by a subscriber is stored in a server separated from mobile exchangers first, and if a certain subscriber is called, a terminating exchanger for the call receives from the server an RBT-replacing sound that is assigned to the called, and then provides the received sound for a caller instead of a conventional RBT.

It is another object of the present invention to provide a method for furnishing a caller with an arbitrary sound chosen or registered by a called subscriber instead of a conventional RBT without fails even in case that a flexible paging is conducted for a called subscriber who is in or moves fast an overlapped service zone.

A method of providing an arbitrary sound as an RBT in a communication network where flexible paging is conducted for a called terminal in accordance with the present invention is characterized in that it comprises: a first step, conducted respectively by both exchangers, of checking whether first information on replacing RBT or not and second information informing a route to a sound providing means have been stored for the called terminal, when an originating exchanger requests a trunk connection to said both exchangers according to a flexible paging procedure, and receiving the first and the second information from an HLR (Home Location Register) after requesting if said information has not been stored, and requesting a trunk connection to the sound providing means while furnishing information identifying the called, based on the already-stored or the received first and the second information; a second step, conducted by the sound providing means, of determining an RBT-replacing sound based on the called-identifying information, and transmitting the determined RBT-replacing sound to the originating exchanger through two paths made respectively by way of said both exchangers; and a third step, conducted by the originating exchanger, of selecting one path of the two, and delivering the determined RBT replacing sound received through the selected path to a caller.

A method of processing location registration in an HLR to provide an arbitrary sound as an RBT in a communication network where flexible paging is conducted for a called terminal in accordance with the present invention is characterized in that it comprises the steps of: furnishing a first exchanger with first information on whether or not RBT is to be replaced for a terminal and second information informing a route to a sound providing means, when location of the terminal is registered through the first exchanger, and retaining a second exchanger as previous location of the terminal, the second exchanger having served the terminal just before; requesting routing information to the first and the second exchanger based on the registered and the retained location information of the terminal when location request for the terminal is received from an originating exchanger, and providing the first and the second information for the second exchanger; and delivering all of routing information received, in response to the routing information request, from the first and the second exchanger to the originating exchanger as a response to the location request.

Another method of processing location registration in an HLR to provide an arbitrary sound as an RBT in a communication network where flexible paging is conducted for a called terminal in accordance with the present invention is characterized in that it comprises the steps of: retaining a second exchanger as previous location of a terminal when location of the terminal is registered through a first exchanger, the second exchanger having served the terminal just before; requesting routing information to the first and the second exchanger based on the registered and the retained location information of the terminal when a location request for the terminal is received from an originating exchanger, and providing both of the first and the second exchanger with first information on whether or not an RBT is to be replaced for the terminal and second information informing a route to a sound providing means; and delivering all of routing information received, in response to the routing information request, from the first and the second exchangers to the originating exchanger as a response to the location request.

Another method of providing an arbitrary sound as an RBT in a communication network where flexible paging is conducted for a called terminal in accordance with the present invention is characterized in that it comprises: a first step, conducted by an HLR, of furnishing a first exchanger and a second one with first information on whether or not an RBT is to be replaced for a terminal and second information informing a route to a sound providing means, when location of the terminal is registered through the first exchanger, wherein the second exchanger is registered as previous location of the terminal; a second step conducted respectively by the first and the second exchanger which are individually requested by an originating exchanger to make a trunk connection to the originating exchanger according to a flexible paging procedure, of requesting the sound providing means to make a trunk connection therebetween while furnishing information identifying the terminal that is called by a subscriber, based on the first and the second information furnished from the HLR; a third step, conducted by the sound providing means, of determining an RBT-replacing sound based on the terminal-identifying information, and transmitting the determined RBT-replacing sound to the originating exchanger through two paths made respectively by way of said both exchangers; and a fourth step, conducted by the originating exchanger, of selecting one path of the two, and delivering the determined RBT replacing sound received through the selected path to the subscriber.

The above-characterized method provides a personal ad way by allowing a registered personal introducing or identifying sound to be used instead of an RBT. In addition, a caller is able to know by only hearing an RBT-replacing sound whether he or she called rightly. An enterprise as well as individual persons can advertise efficiently through registering an RBT-replacing sound.

Especially, an RBT-replacing sound is provided for a caller without fails even when a flexible paging is conducted.

4. BRIEF DESCRIPTION OF DRAWINGS

In the drawings:

FIG. 3 is a simplified diagram of a mobile communication network which a subscriber-based RBT-replacing sound providing method is embedded in;

FIG. 9 shows format of the value-added service parameters including an RBT-replacing service field that are delivered from an HLR to a call-terminating exchanger.

5. MODES FOR CARRYING OUT THE INVENTION

In order that the invention may be fully understood, a preferred embodiment thereof will now be described with reference to the accompanying drawings.

Figure 1:
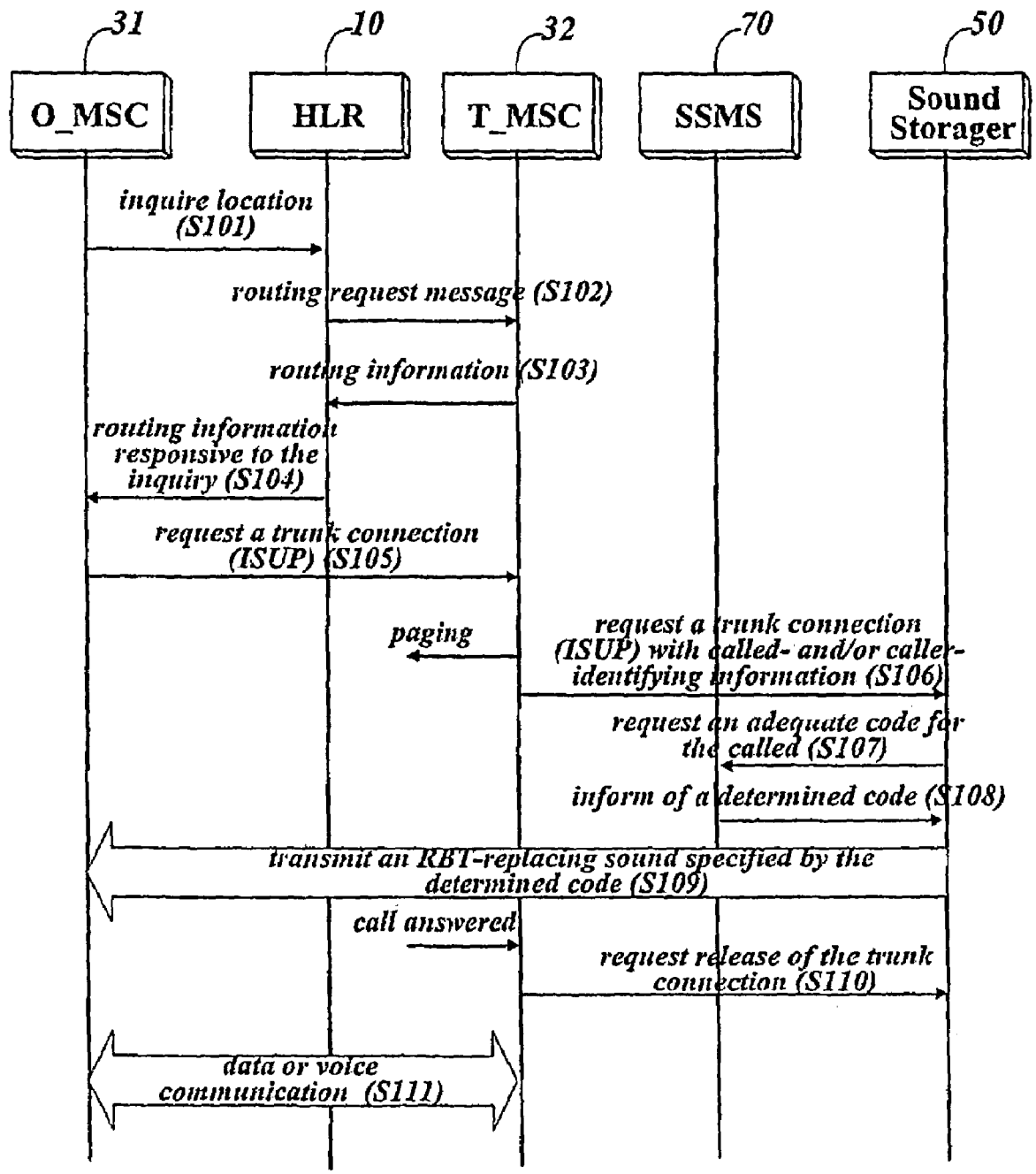
FIG. 1 is a procedure chart of an embodiment of a subscriber-based RBT-replacing sound providing service in accordance with the present invention.

FIG. 1 is a procedure chart of conducting a subscriber-based RBT-replacing sound providing service in accordance with the present invention. The procedure of FIG. 1 is conducted through a mobile communication network structured as FIG. 3.

Figure 3:
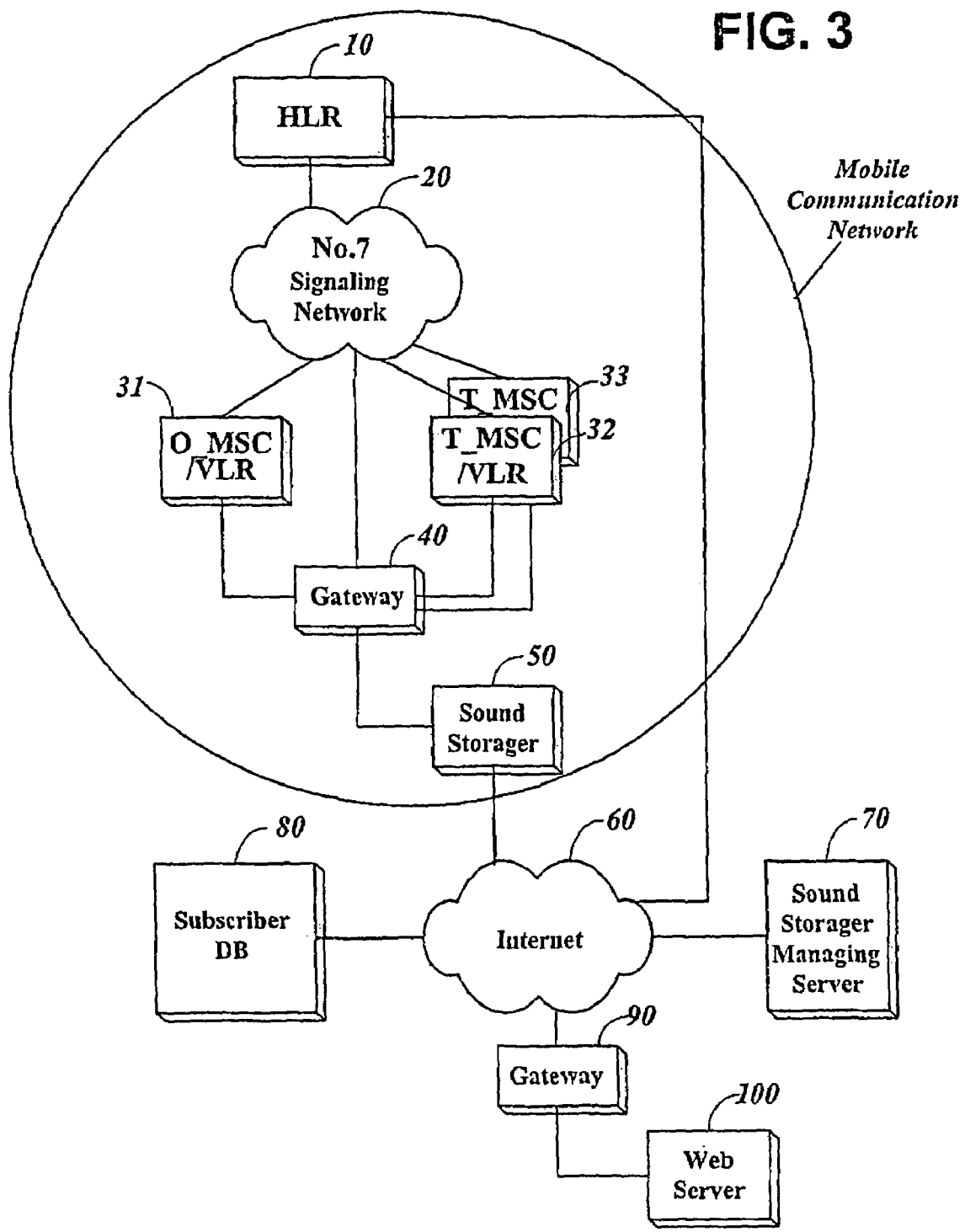

The network of FIG. 3 includes an HLR (Home Location Register) 10; mobile exchangers 31, 32 and 33 (also called 'MSC' (Mobile Switching Center)) being capable of communicating with the HLR 10 via a No. 7 signaling network 20 based on No. 7 signaling transfer protocol; a sound storager 50, connected to the No. 7 signaling network 20 via a gateway 40, storing RBT-replacing sounds and communicating with the exchangers 31, 32 and 33; an SSMS (Sound Storager Managing Server) 70, connected to the sound storager 50 via Internet 60, controlling management of RBT-replacing sounds in the sound storager 50; a subscriber db 80 connected to the HLR 10 via Internet 60; and a web server 100, connected to Internet 60 via a gateway 90, communicating with the sound storager 50 and the SSMS 70.

The HLR 10 functions as a conventional network element and it has in every subscriber profile the first information on whether or not an RBT is to be replaced and the second information informing a route to the sound storager 50. The first and the second information are written in the value-added service parameters of each subscriber profile.

Furthermore, when location registration of a mobile terminal is changed from an exchanger to another, the HLR 10 stores identification of a current serving exchanger, which the terminal has just registered to, while retaining identification of a previous serving exchanger. The reason not to delete identification of the previous serving exchanger is for conducting flexible paging.

The HLR 10 can send the above-mentioned first and the second information through a routing request message (e.g., a message sent at the step S102 in FIG. 1) to a call-terminating exchanger 32 or 33. The routing request message is sent in order to set up a trunk connection between a call-originating exchanger and a call-terminating one.

Either of the mobile exchangers 31 and 32 functioning as conventional network elements receives the first and the second information of a subscriber through communicating with the HLR 10 when the subscriber requests location registration. If the location-registered subscriber is called, the exchanger 31 or 32 receives an RBT-replacing sound from the sound storager 50 based on the received first and second information, and then provides a caller with the received RBT-replacing sound.

Furthermore, either of the exchangers 31 and 32 searches its local db, namely, VLR (Visitor Location Register) for the first and the second information of a called terminal before making a call to the terminal. If it has not the first and the second information, it requests the HLR 10 to download that information.

The sound storager 50 stores a plurality of digital sounds to be used for replacing an RBT. The stored digital sounds are provided for the exchangers 31 and 32 via the gateway 40.

The SSMS 70 communicates with the sound storager 50 via Internet 60 and it chooses a digital sound based on information written in an RBT service table. A unique code to identify the chosen digital sound is notified the sound storager 50 in order that a stored sound identified by the code is sent to the exchanger 31 or 32 from the sound storager 50. The RBT service table used for choice of a digital sound allocated for each subscriber includes several codes linked to caller's personal information, caller or caller-group identifying information, and/or call time zone. Therefore, a digital sound can be chosen by the SSMS 70 based on who calls, which group a caller belongs to, age, sex, or occupation of a caller, and/or when a subscriber is called.

Information in the RBT service table is determined when a person subscribes to the value-added service and is then modified by his or her request.

The web server 100, connected to the sound storager 50 and/or the SSMS 70 via Internet 60, adds digital sounds to the sound storager 50 and conducts operations to update or change contents of the RBT service table and codes, if necessary, related digital sounds for the SSMS 70. The updating or changing operation is initiated by subscriber's request through web pages of the web server 100.

The RBT sound providing procedure depicted in FIG. 1 conducted through the network of FIG. 3 is described in detail below.

If an arbitrary subscriber within a service zone of the exchanger 31 calls another subscriber within the exchanger 32 who has subscribed to the RBT replacement service, the originating exchanger 31 sends a location request message to the HLR 10 to inquire where the called is (S101). Then, the HLR 10 sends a routing request message to the terminating exchanger 32 (S102), and the terminating exchanger 32 informs the HLR 10 of routing information, e.g., TLDN (Temporary Local Directory Number) in response to the routing request message (S103).

The HLR 10 delivers the routing information to the originating exchanger 31 in response to the inquiry step S101 (S104). The originating exchanger 31 requests the terminating exchange 32 based on the routing information to make a trunk connection therebetween (S105). The call for trunk connection is called 'ISUP' in common.

In the meantime, the terminating exchanger 32 checks the information related with the present RBT-replacing service (e.g., 'SRBT' field of FIG. 9 that was registered for the called in its local db at the step S408-2 in the procedure of FIG. 4) to know if the RBT-replacing service for the called is 'in-service' and 'activated' as well. If then, the terminating exchanger 32 makes a trunk connection (ISUP) to the sound storager 50 with reference to the routing information that was also received and stored at the step S408-2 in the procedure of FIG. 4. At this time, mobile telephone numbers of the caller and the called are sent to the sound storager 50 (S106). While the above processes are conducted, a conventional common RBT is not transmitted to the originating exchanger 31.

Now, respective trunk connections are made between the originating exchanger 31 and the terminating one 32 and between the terminating exchanger 32 and the sound storager 50.

The information related with RBT-replacing service is provided (at the step S408-2 in the procedure of FIG. 4) from the HLR 10 to a serving exchanger, which a terminal has registered to, through a response message to location registration request 'Registration Notification' from the serving exchanger.

The sound storager 50 asks an adequate code to the SSMS 70 while providing the received numbers for the SSMS 70 (S107). The SSMS 70 examines an RBT service table allocated for the called number to determine a code matched with the calling number (if received), and informs the sound storager 50 of the determined code (S108) in response to the code-requesting step S107. The sound storager 50 transmits an RBT-replacing sound corresponding to the determined code to the caller through the trunk connections between the sound storager 50 and the terminating exchanger 32 and between the terminating exchanger 32 and the originating one 31 (S109).

If the called answers call arrival from the terminating exchanger 32 while the determined RBT-replacing sound is being transmitted instead of a conventional RBT, the terminating exchanger 32 requests the sound storager 50 to release the established trunk connection (S110). Then, voice or data are communicated between the caller and the called through the trunk connection between the originating 31 and the terminating exchanger 32 (S111).

The HLR 10 stores an identification, e.g., TLDN or accessing address of a currently serving exchanger, which a terminal has been registered to, in order to deliver a call to the terminal if called.

By the way, if the terminal frequently changes its location between the serving exchanger and a neighboring exchanger while crossing an overlapped zone of the respective coverage of the two exchangers, registration/cancellation processes are conducted among the HLR 10 and both of the exchangers as frequently as the location changes. Such frequent processes cause undesirable burden to a communication network.

Therefore, a location updating threshold time is used in the HLR 10 for alleviating such a load. Location of a terminal registered in the HLR 10 is not updated within the threshold time after registration of the same terminal.

Consequently, actual location of a terminal is not registered immediately in the HLR 10, which leads to difference between the actual location of the terminal and registered location information, namely, exchanger identification stored in the HLR 10. If the terminal is called under this situation, the HLR 10 may send a routing request message to wrong exchanger which is regarded a right one by the HLR 10 since the terminal is probably out of a coverage of the exchanger.

Figure 2:
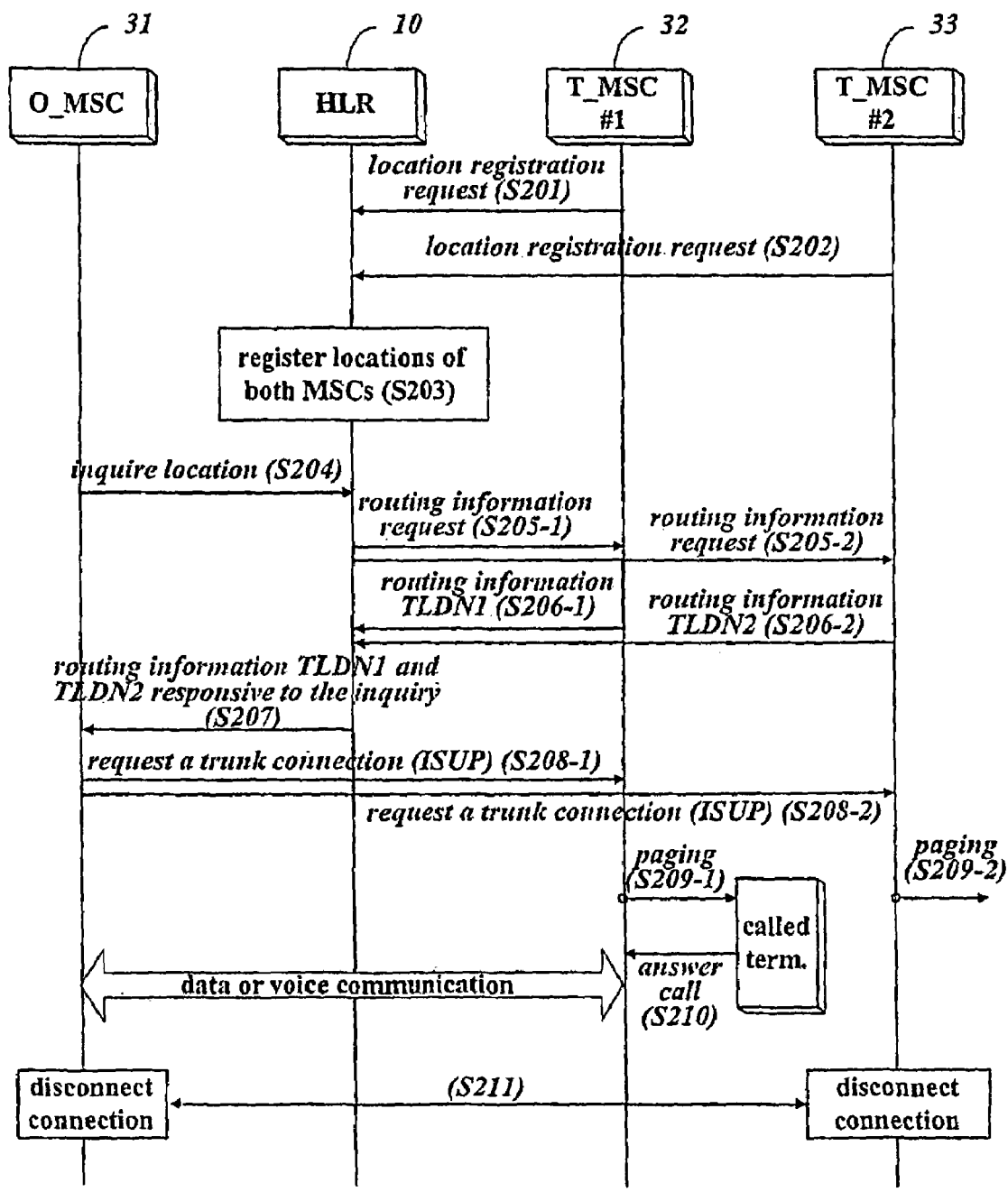
FIG. 2 is a procedure chart of a flexible paging that has been proposed by this applicant.

To solve this problem, a flexible paging method depicted in FIG. 2 has been proposed by the present applicant. The flexible paging method is briefly explained below.

In case that a terminal moves into a coverage of the second exchanger 33 (S202) after it is registered to the first exchanger 32 in the HLR 10 (S201), the HLR 10 updates current location information from the first exchanger 32 to the second 33 while retaining identification, e.g., accessing address of the first 32 as previous location information. That is, location information for both exchangers is preserved for the terminal in the HLR 10 (S203).

If another terminal within a coverage of an exchanger 31 calls the terminal, the originating exchanger 31 sends the HLR 10 a location request message 'LOCREQ' asking where the called terminal is (S204).

Then, the HLR 10 sends, based on the location information, a call-routing request message 'ROUREQ' to the first exchanger 32 (S205-1), which is previous location of the called terminal, as well as the second exchanger 33 (S205-2) which is regarded current location. Thus, both exchangers 32 and 33 send routing information directed to themselves, TLDN1 and TLDN2 to the HLR 10 respectively in response to the message 'LOCREQ' (S206-1, S206-2).

The HLR 10 delivers the received routing information, e.g., TLDN1 and TLDN2 to the originating exchanger 31 in response to the step S204 (S207). Then, the originating exchanger 31 makes dual trunk connections to both of the exchangers 32 and 33 simultaneously (S208-1, S208-2) based on the received routing information.

If dual trunk connections are made, the first exchanger 32 and the second 33 send a common RBT respectively to the calling terminal (not shown) through the originating exchanger 31. At the same time, both of the exchangers 32 and 33 transmit a paging signal (S209-1, S209-2).

If the called, which is moving here and there in an overlapped service zone between the exchangers 32 and 33, answers the paging signal from the first terminating exchanger 32 first (S210), the originating exchanger 31, acknowledging the call answer from the first terminating exchanger 32, releases the trunk connection to the second terminating exchanger 33 to sustain only one connection to the first 32, which will be used for data or voice communication between the caller and the called (S211).

By the way, information related with RBT replacing service is downloaded to an exchanger, which a certain subscriber is registered to, through a response message to location registration request as explained in the embodiment of RBT replacing service depicted in FIG. 1. Therefore, in the above-explained flexible paging, only one of both exchangers 32 and 33 has the information related with RBT replacing service in the event that the called has been subscribed to RBT replacing service.

Therefore, in the embodiment of FIG. 1, if the called responds the paging from the first terminating exchanger 32 first in the event that the second exchanger 33 is lately registered for the called in the HLR 10, an RBT replacing sound can not be provided for the calling terminal because not the first 32 but the second exchanger 33 has RBT service related information. That is, the first terminating exchanger 32, which has not RBT service related information for the called, can not make a trunk call to the sound storager 50, so that it can not obtain a certain sound to replace a common RBT.

The above subscriber-based RBT sound providing service can be substantially embodied through the mobile communication network of FIG. 3 as follows.

When a subscriber applies for subscription to the value-added service of RBT replacement all information included in the application is stored in the subscriber db 80 that requests registration of RBT replacement service to the HLR 10. Then, the HLR 10 writes necessary information in value-added service parameters of that subscriber.

Afterwards, if location registration for that subscriber is requested from a serving exchanger 31 or 32, e.g., the exchanger 32 the HLR 10 provides RBT service-related information and routing information for the exchanger 32 that requested location registration. The routing information is needed to make a trunk connection to the sound storager 50. The exchanger 32 registers the received information for that subscriber in a local subscriber db.

If an arbitrary subscriber at the exchanger 31 calls the location-registered subscriber, a trunk connection 'ISUP' is made between the originating 31 and the terminating exchanger 32 after routing information exchange through the HLR 10. After a trunk connection is setup, the terminating exchanger 32, knowing based on the registered information of the called subscriber that RBT replacement service is ON, makes another trunk connection to the sound storager 50 addressed by the registered information. At the same time, the terminating exchanger 32 provides the sound storager 50 with information of the called subscriber, e.g., mobile telephone number and starts to page the called.

The sound storager 50 inquires of the SSMS 70 about which digital sound is set now for the called subscriber. Then, the SSMS 70 informs the sound storager 50 of a code for digital sound having been chosen for a given condition by the called.

The sound storager 50 sends a digital sound identified by the received code to the originating exchanger 31 through the setup trunk connection between the two exchangers 31 and 32. The originating exchanger 31 transmits the digital sound from the sound storager 50 to the caller until the called answers the call. Thus, the caller can hear the digital sound instead of a conventional RBT during the paging. The moment the called answers the paging, the terminating exchanger 32 releases the trunk connection established to the sound storager 50. The conversation between the caller and the called is communicated through the trunk connection made between the originating 31 and the terminating exchanger 32.

Figure 4:
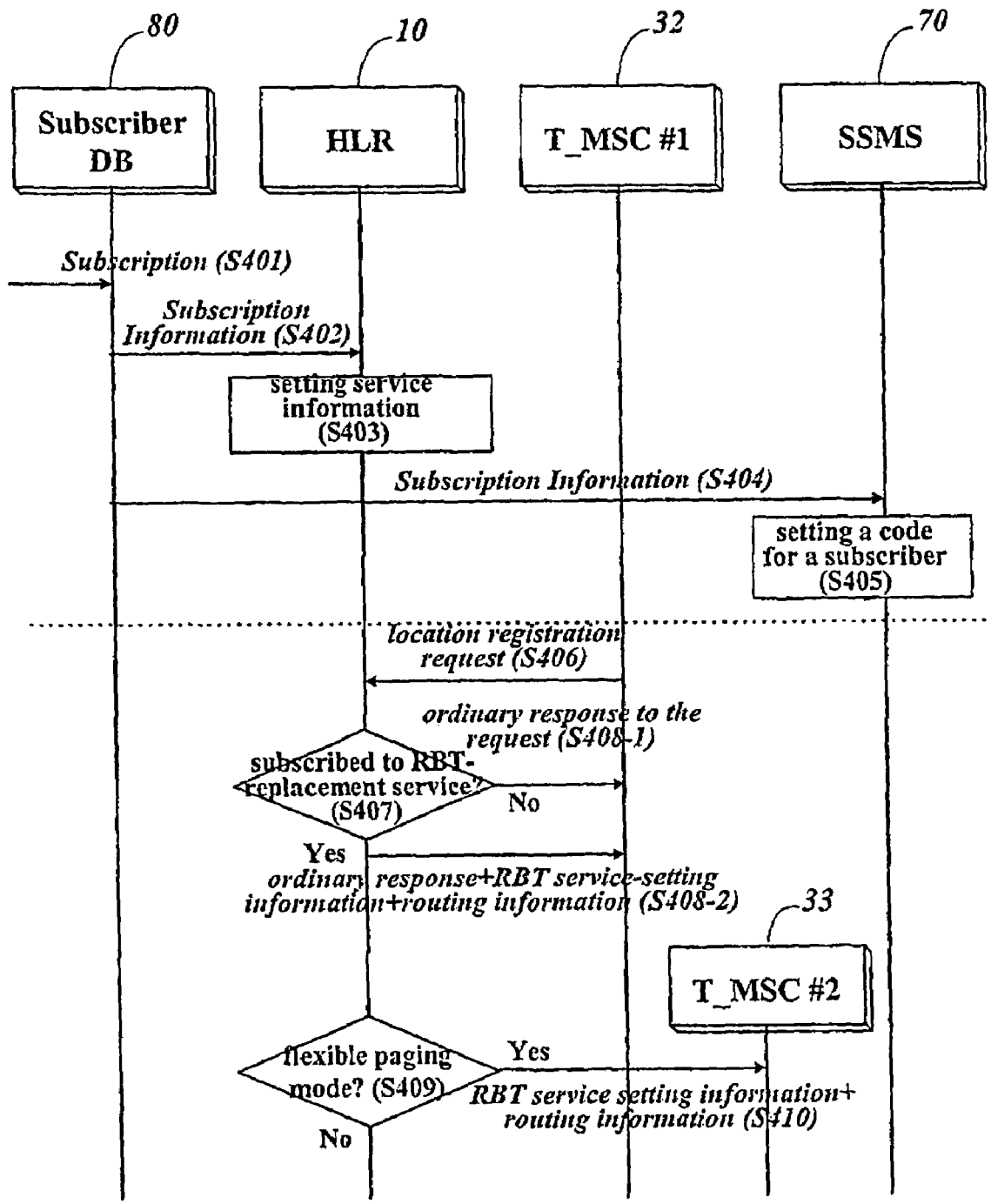
FIG. 4 is a procedure chart to subscribe to a subscriber-based RBT-replacing sound providing service in accordance with the present invention.

FIG. 4 is a procedure chart to subscribe to a subscriber-based RBT-replacing sound providing service in accordance with the present invention.

If subscription to the RBT-replacement service is asked (S401), subscription information including mobile telephone number of the subscriber is stored in the subscriber db 80 first and is then delivered to the HLR 10 (S402). The HLR 10 updates service information of the subscriber profile to indicate that the subscriber has subscribed to RBT replacement service (S403).

In addition, the subscriber db 80 also sends the subscription information including a chosen digital sound and mobile telephone number to the SSMS 70 (S404). The SSMS 70 writes a code associated with the chosen digital sound in an RBT service table allocated for that mobile telephone number (S405).

If the received subscription information includes particulars of sound assignments, namely if the received subscription information assigns different digital sounds for each caller, each caller group, and/or each time zone, the SSMS 70 writes different codes of the respective digital sounds in each condition field of the RBT service table, at the step S405.

Afterwards, if location registration for the subscriber is requested from the exchanger 32 to the HLR 10 (S406), the HLR 10 checks profile of the subscriber to know whether the subscriber has been subscribed to the RBT replacement service (S407). If not subscribed, the HLR 10 sends an ordinary response message to the location registration request to the exchanger 32 as in the conventional request processing procedure (S408-1). However, if subscribed, the HLR 10 sends the exchanger 32 a response message including RBT service-related information and routing information, e.g., routing digits to direct to the sound storager 50. The exchanger 32 registers the received information in the subscriber's profile on a local db, e.g., a VLR (Visitor Location Register) (S408-2).

The RET service-related information can be carried by an SRBT (Specific RBT) field, which was defined as a 'reserve' field before, of the value-added service parameters 'CallingFeaturesIndicator2' shown in FIG. 9. The 2-bit SRBT field is set to '10' in case that the RBT replacement service is not activated even though that service is valid by subscription, and it is set to '11' in case that the RBT replacement service is in active state. A message including the parameters 'CallingFeaturesIndicator2' responsive to the location registration request is delivered from the HLR 10 to the exchanger 32.

The service information parameters 'CallingFeaturesIndicator2' of FIG. 9 are composed of a VMSB field indicative of state of voice mail service busy; a VMSU field indicative of state of voice mail service busy unconditional; a VMSNA field indicative of state of voice mail service busy no answer; an FMSNA field indicative of state of fax mail service no answer; an FMSB field indicative of state of fax mail service busy; an FMSU field indicative of state of fax mail service unconditional; an MC field indicative of multi-call; a CC field indicative of conference call; an MUDN field indicative of multiple unit directory number; and others.

After the step S408-2 is completed, the HLR 10, as shown in FIG. 4, may conduct additional following steps.

The HLR 10 checks whether a flexible paging mode is set or not (S409). If flexible paging mode, the HLR 10 also sends the RBT service-related information including RBT service setting information and routing information to a previously-serving exchanger 33 (S410), based on location information of both exchangers, namely, the current serving exchanger 32, which the subscriber has just registered to, and the previous serving exchanger 33. At this time, the RBT service-related information can be provided for the exchanger 33, that is regarded not-serving exchanger, through a newly-defined message that is not a response message to location registration request one.

The steps S406 to S408-2 are preferable in the RBT replacing service, however, those steps may be selectively used in consideration of other procedures adopted in different embodiments which will be described later. In addition, the steps S409 to S410 are also selectively used in consideration of other procedures adopted in different embodiments which will be described later. However, these steps need to define a new message format, so that other embodiments depicted in FIGS. 7 and 8, which need not the two steps S409 and S410, are more preferable.

Figure 5:
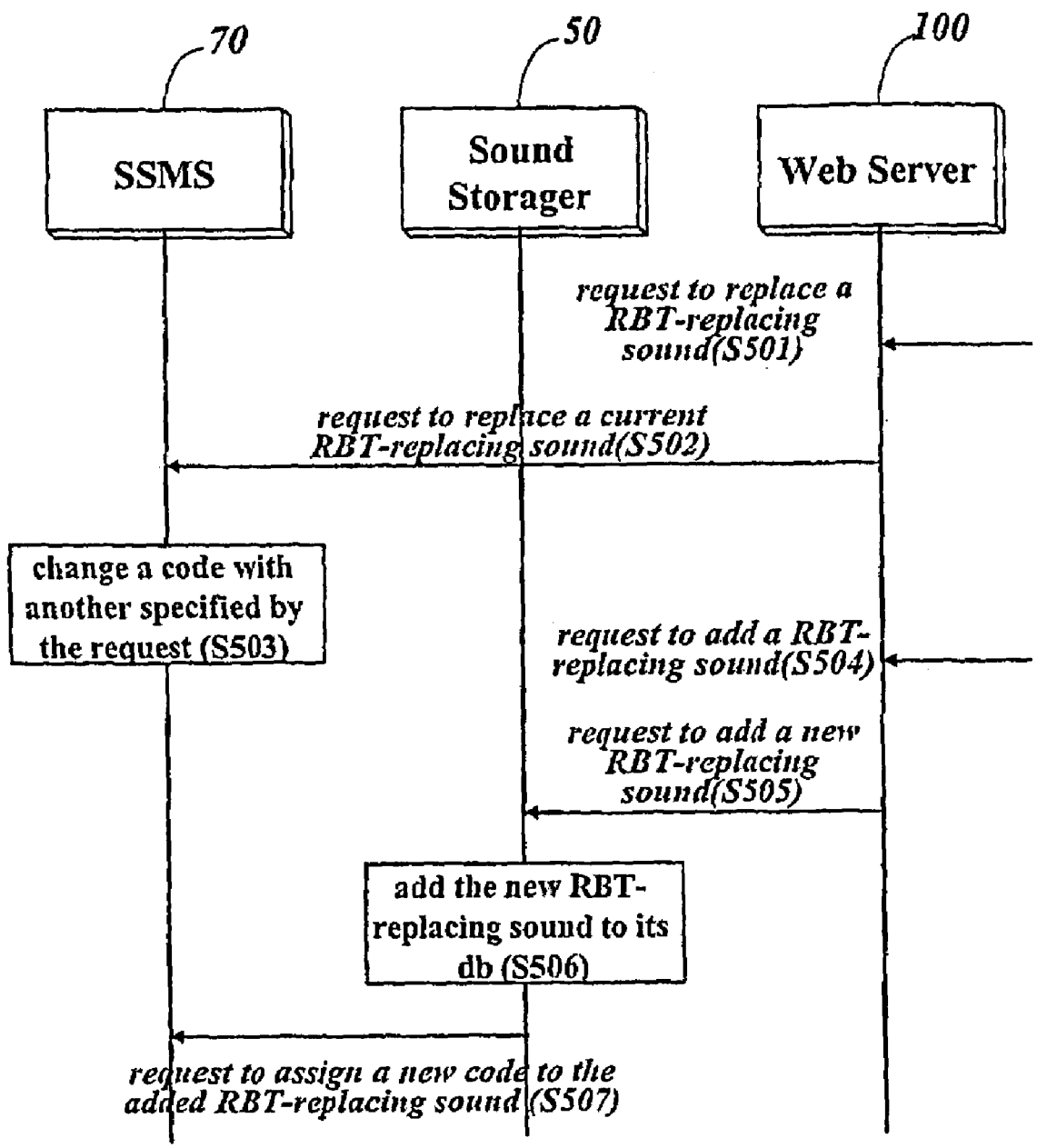
FIG. 5 is a procedure chart to change/add an RBT sound to be used in RBT-replacing sound providing service in accordance with the present invention.

FIG. 5 is a procedure chart to change/add an RBT sound to be used in RBT-replacing sound providing service in accordance with the present invention.

A subscriber, who has subscribed to the RBT replacement service according to the above-explained procedure of FIG. 4, connects his or her personal computer to the web server 100, first. Then, the web server 100 provides web pages on the connected computer screen to enable the subscriber to change/add information about RBT replacement service.

The subscriber enters mobile telephone number through an adequate web page and then selects a desired RBT-replacing sound from a list showing all or a part of sounds stored in the sound storager 50. If the subscriber requests change of RBT-replacing sound to the chosen one (S501), the web server 100 sends a change-requesting message to the SSMS 70 (S502). The SSMS 70 changes the current code with another code assigned to the chosen RBT-replacing sound in an RBT service table allocated for the entered mobile telephone number (S503). Afterwards, an RBT-replacing sound identified by the changed code will be provided instead of a conventional RBT.

If the subscriber selects to add a new RET-replacing sound on a web page, the SSMS 70 provides an input web page. Then, the subscriber enters his or her mobile telephone number in the input web page and uploads a sound file including voice, sound logo, or music through the input web page (S504). The web server 100 requests the sound storager 50 to add a new RBT-replacing sound by delivering the inputted data to the sound storager 50 (S505). The sound storager 50 registers the uploaded sound file as a new RBT-replacing sound (S506) and requests the SSMS 70 to assign a new code to the registered RBT-replacing sound (S507). The SSMS 70 informs the sound storager 50 of the newly-assigned code and changes the current code with the newly-assigned code in an RBT service table allocated for the subscriber.

Figure 6:
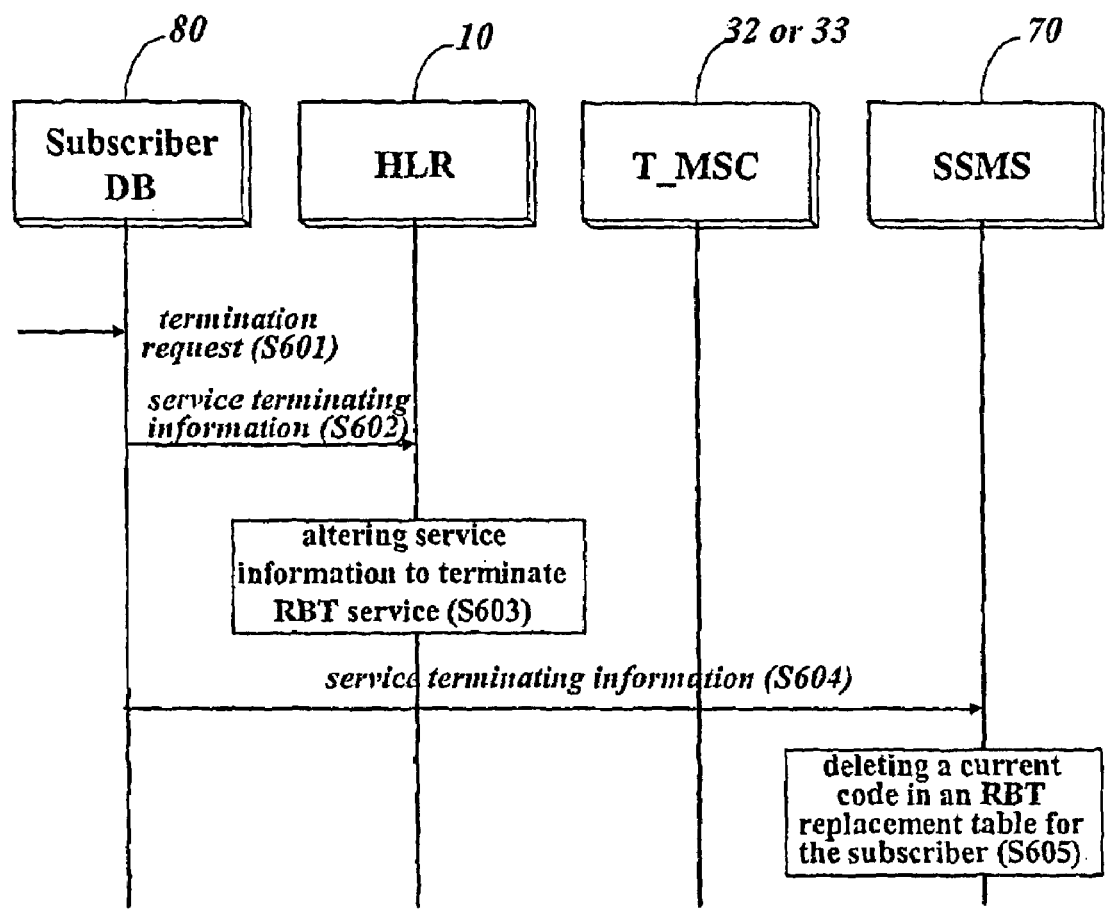
FIG. 6 is a procedure chart to terminate a subscriber-based RBT-replacing sound providing service in accordance with the present invention.

FIG. 6 is a procedure chart to terminate a subscriber-based RBT-replacing sound providing service in accordance with the present invention.

If termination of RBT replacement service is asked from a subscriber (S601), the subscriber db 80 deletes subscription information for RBT replacement service associated with the subscriber, namely, the subscriber's telephone number, and sends service terminating information including a mobile telephone number to the HLR 10 (S602). The HLR 10 alters service information of the subscriber's profile to indicate that the subscriber has not subscribed to RBT replacement service (S603).

The subscriber db 80 also sends the service terminating information to the SSMS 70 (S604), then the SSMS 70 deletes a current code, allocated at the step S305, in an RBT service table for the subscriber based on the received service terminating information (S605).

Figure 7:
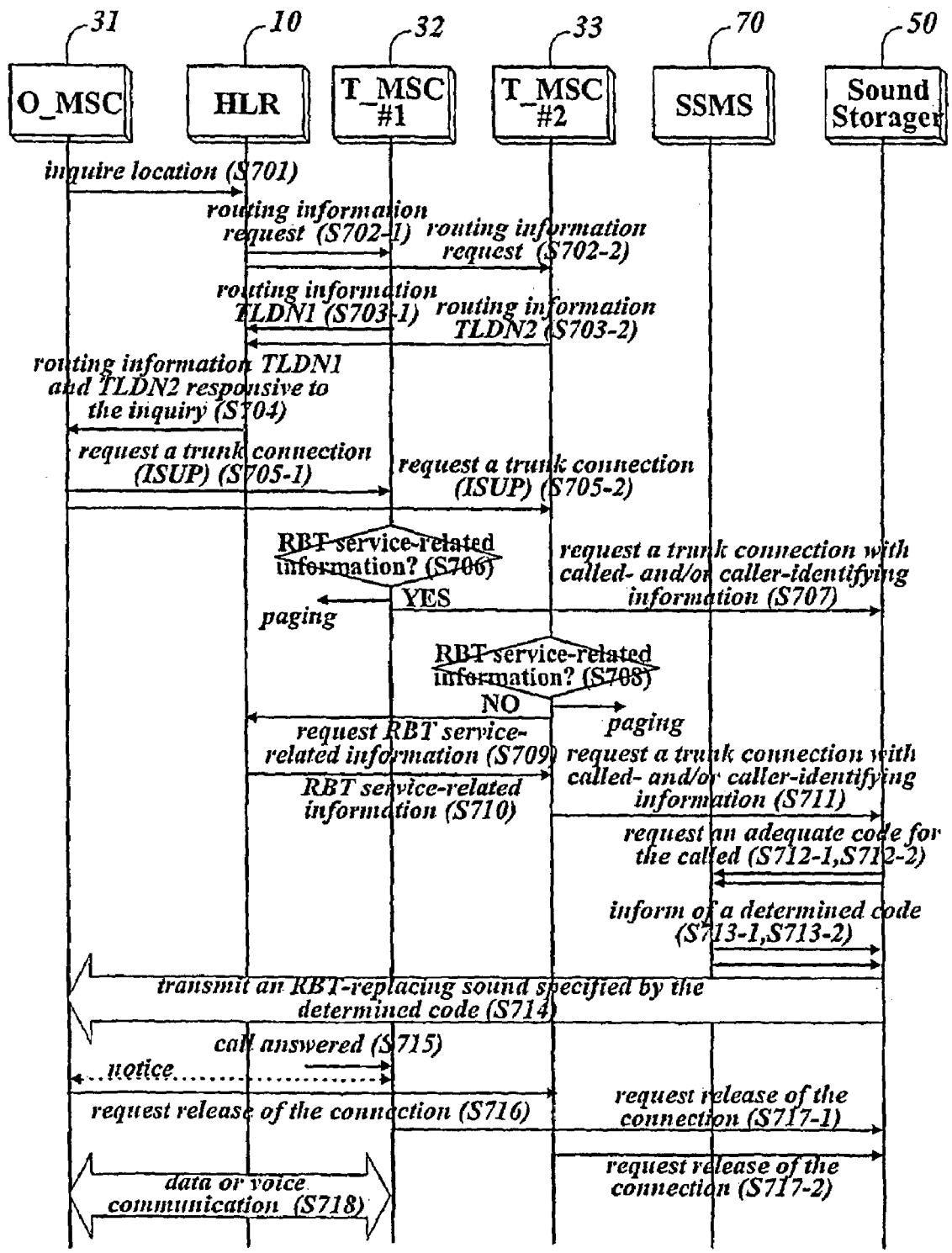
FIG. 7 is a procedure chart of an embodiment to provide a subscriber-based RBT replacing service in case of flexible paging in accordance with the present invention.

FIG. 7 is a procedure chart of another embodiment of the present invention to conduct a subscriber-based RBT-replacing sound providing service after completion of the procedure of FIG. 4 and/or 5. This embodiment always has an RBT replacing sound provided for a caller even in case of flexible paging.

In addition, for the embodiment given in FIG. 7, the steps S406 to S408 in the RBT replacement service subscribing procedure of FIG. 4 have been conducted, however, the steps S409 and S410 have not been conducted.

If an arbitrary subscriber within a service zone of the exchanger 31 calls another subscriber, who has subscribed to the RBT replacement service, within the exchanger 32, the originating exchanger 31 sends a location request message to the HLR 10 to inquire where the called is (S701).

Then, the HLR 10 sends a routing request message to both of the first terminating exchanger 32 and the second 33 simultaneously (S702-1, S702-2) based on previous and current location information for flexible paging that has been retained by the step S203 in the procedure of FIG. 2. It is assumed that the first exchanger 32 is a current serving one that is lately registered for the called subscriber in the HLR 10 and that the second exchanger 33 is a previously serving one. Both of the exchangers 32 and 33 send individual routing information, e.g., TLDN1 and TLDN 2 to the HLR 10 in response to the routing request message (S703-1, S703-2).

The HLR 10 delivers all the routing information TLDN1 and TLDN2 from both exchangers 32 and 33 to the originating exchanger 31 in response to the inquiry step S701 (S704). Then, the originating exchanger 31 requests, based on the received routing information, both of the first terminating exchange 32 and the second 33 to make dual trunk connections to the first exchanger 32 and the second 33 (S705-1, S705-2).

In the meantime, the first terminating exchanger 32 checks whether or not it has RBT service-related information for the called (S706). In the above assumption, since the first terminating exchanger 32 is registered lately in the HLR 10 the RBT service-related information including RBT service setting information, e.g., SRBT field shown in FIG. 9 for the called has been already delivered to the first exchanger 32 at the step 408-2 in the procedure of FIG. 4. If the two bits of the received 'SRBT' field are '11' which means 'in-service' and 'activated', the first terminating exchanger 32 makes a trunk connection to the sound storager 50, which is assigned to the called subscriber, with reference to the routing information included in the RBT service-related information that has been received and stored at the step S408-2. At this time, mobile telephone numbers of the caller and the called are sent to the sound storager 50 (S707). While the above processes are conducted, a conventional RBT is not transmitted to the originating exchanger 31.

In the meantime, the second exchanger 33 also checks whether or not it has RBT service-related information for the called (S708). If it had, it could make a trunk connection to the sound storager 50 the same as the first exchanger 32. However, it has not the RBT service-related information for the called or has deleted, so that it requests RBT service-related information for the called to the HLR 10 (S709) and stores in its local db if received (S710). And, the second exchanger 33 makes a trunk connection to the sound storager 50 with reference to the received RBT service-related information as the step S707. At this time, mobile telephone numbers of the caller and the called are sent to the sound storager 50 (S711).

Now, dual paths are made between the originating exchanger 31 and the sound storager 50 via the first terminating exchanger 32 and between the originating exchanger 31 and the sound storager 50 via the second terminating exchanger 33.

Each time the sound storager 50 receives calling and/or called number it asks an adequate code to the SSMS 70 while providing the received number for the SSMS 70 (S712-1, S712-2). The SSMS 70 examines an RBT service table allocated for the called number to determine a code matched with the calling number (if received), and informs the sound storager 50 of the determined code twice (S713-1, S713-2) in response to the code-requesting steps S712-1 and S712-2.

The sound storager 50 transmits an RBT-replacing sound corresponding to the determined code to the originating exchanger 31 through the dual trunk connections made to the first terminating exchanger 32 and to the second 33. Then, the originating exchanger 31 selects one trunk connection of the two that is made to the exchanger 32 or 33 that responded first to the ISUP requests of the steps S705-1 and S705-2, and delivers an RBT replacing sound received through the selected trunk connection to the caller (S714).

If the called answers paging of either of both terminating exchangers 32 and 33 (S715) while the determined RBT-replacing sound is being transmitted instead of a conventional RBT, the originating exchanger 31, that is informed of the call answer by either exchanger 32 or 33, requests the other exchanger, whose paging is not answered, to release the established trunk connection (S716). In this embodiment, it is assumed that the called answers the call paging from the first terminating exchanger 32, so that the trunk connection made to the first terminating exchanger 32 is maintained while the other trunk connection to the second exchanger 33 is released.

Afterwards, the first terminating exchanger 32, based on the call answer, requests the sound storager 50 to release the established trunk connection (S717-1) and the second terminating exchanger 33, based on the request of ISUP release from the originating exchanger 31, requests the sound storager 50 to release the established trunk connection (S717-2). At the same time, voice or data are communicated between the caller and the called through the trunk connection between the originating 31 and the first terminating exchanger 32 (S718).

Figure 8:
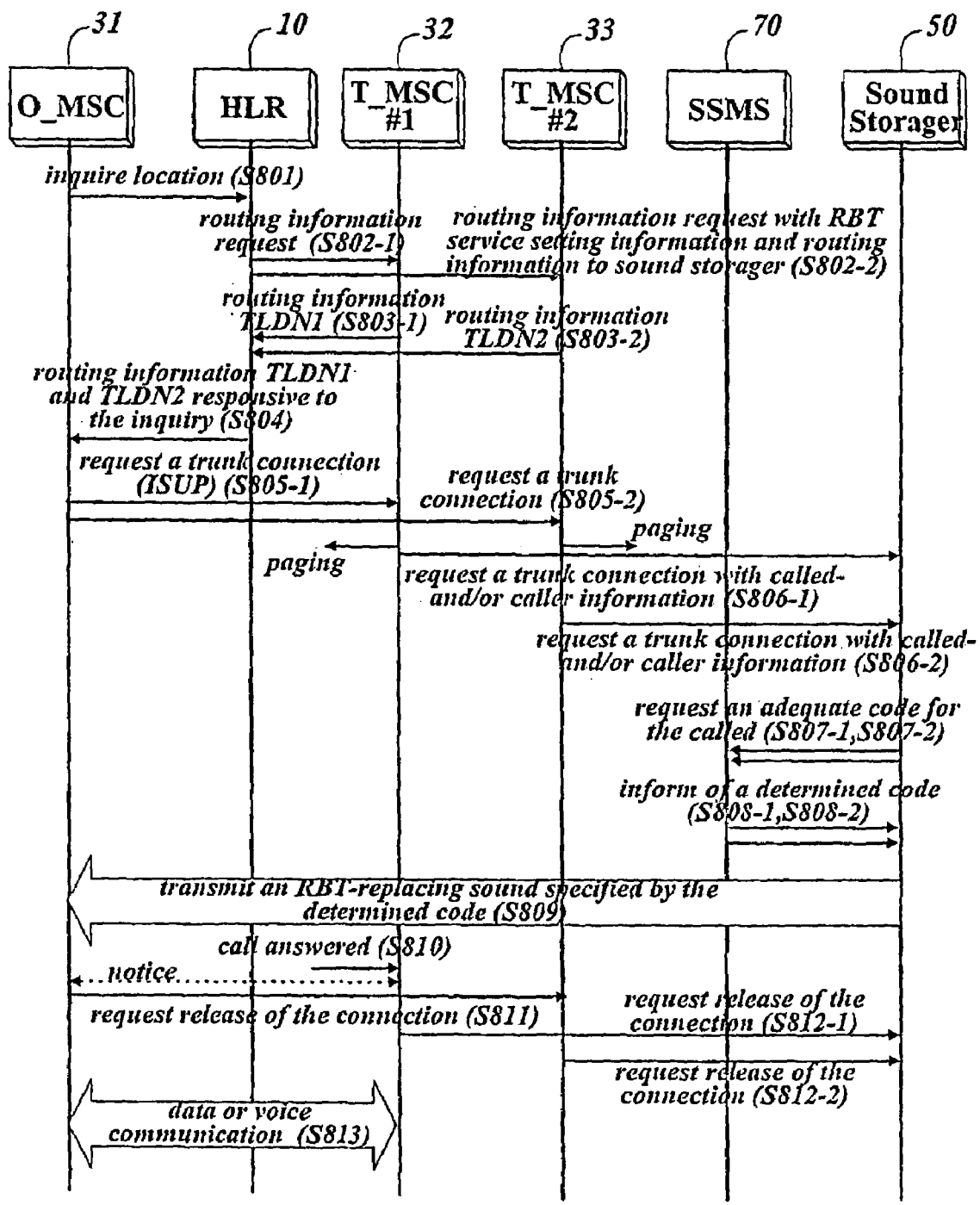
FIG. 8 is a procedure chart of another embodiment to provide a subscriber-based RBT replacing service in case of flexible paging in accordance with the present invention.

FIG. 8 is a procedure chart of another embodiment of the present invention to conduct a subscriber-based RBT-replacing sound providing service after completion of the procedure of FIG. 4 and/or 5. This embodiment also has an RBT replacing sound provided for a caller even in case of flexible paging.

In addition, for the embodiment given in FIG. 8, the steps S406 to S408 in the RBT replacement service subscribing procedure of FIG. 4 have been conducted, however, the steps S409 and S410 have not.

If an arbitrary subscriber within a service zone of the exchanger 31 calls another subscriber, who has subscribed to the RBT replacement service, within the exchanger 32, the originating exchanger 31 sends a location request message to the HLR 10 to inquire where the called is (S801).

Then, the HLR 10 sends a routing request message to both of the first terminating exchanger 32 and the second 33 simultaneously based on previous and current location information for flexible paging that has been retained by the step S203 in the procedure of FIG. 2. If it is assumed that the first exchanger 32 is a current serving one that is lately registered for the called subscriber in the HLR 10 and that the second exchanger 33 is a previously serving one, the HLR 10 knows that it has already sent RBT service-related information to the first terminating exchanger 32 when location registration of the called is conducted. Therefore, the HLR 10 sends an ordinary routing request message to the first terminating exchanger 32 (S802-1) while sending the second terminating exchanger 33 a special routing request message (S802-2) that includes RBT service-related information for the called.

Accordingly, both of the exchangers 32 and 33 send routing information, e.g., TLDN1 and TLDN 2 to the HLR 10 in response to the individual routing request messages of the steps S802-1 and S802-2 (S803-1, S803-2).

The HLR 10 delivers all the routing information TLDN1 and TLDN2 from both exchangers 32 and 33 to the originating exchanger 31 in response to the inquiry step S801 (S804). Then, the originating exchanger 31 requests, based on the received routing information, both of the first terminating exchange 32 and the second 33 to make dual trunk connections to the first exchanger 32 and the second 33 (S805-1, S805-2).

The first terminating exchanger 32 makes a trunk connection to the sound storager 50, that is assigned to the called subscriber, with reference to the routing information included in RBT service-related information (S806-1) that has been received and stored at the step S408-2 while the second terminating exchanger 33 does the same (S806-2) with reference to RBT service-related information that is received at the step S802-2. At each trunk connection requesting step, mobile telephone numbers of the caller and the called are sent to the sound storager 50.

Now, dual paths are made between the originating exchanger 31 and the sound storager 50 via the first terminating exchanger 32 and between the originating exchanger 31 and the sound storager 50 via the second terminating exchanger 33.

Each time the sound storager 50 receives calling and/or called number it asks an adequate code to the SSMS 70 while providing the received number for the SSMS 70 (S5807-1, S807-2). The SSMS 70 examines an RBT service table allocated for the called number to determine a code matched with the calling number (if received), and informs the sound storager 50 of the determined code twice (S808-1, S808-2) in response to the code-requesting steps S807-1 and S807-2.

The sound storager 50 transmits an RBT-replacing sound corresponding to the determined code to the originating exchanger 31 through both of the trunk connections made to the first terminating exchanger 32 and to the second 33.

Then, the originating exchanger 31 selects one trunk connection of the two that is made to the exchanger 32 or 33 that responded first to the ISUP requests of the steps S805-1 and S805-2, and delivers an RBT replacing sound received through the selected trunk connection to the caller (S809).

If the called answers paging of either of both terminating exchangers 32 and 33 (S810) while the determined RBT-replacing sound is being transmitted instead of a conventional RBT, the originating exchanger 31, that is informed of the call answer by either exchanger 32 or 33, requests the other exchanger, whose paging is not answered, to release the established trunk connection (S811). In this embodiment, it is assumed that the called answers the call paging from the first terminating exchanger 32, so that the trunk connection made to the first terminating exchanger 32 is maintained while the other trunk connection to the second exchanger 33 is released.

Afterwards, the first terminating exchanger 32, based on the call answer, requests the sound storager 50 to release the established trunk connection (SB12-1) and the second terminating exchanger 33, based on the request of ISUP release from the originating exchanger 31, requests the sound storager 50 to release the established trunk connection (S812-2). At the same time, voice or data are communicated between the caller and the called through the trunk connection between the originating 31 and the first terminating exchanger 32 (S813).

Another embodiment of the present invention to conduct a subscriber-based RBT-replacing sound providing service after completion of the procedure of FIG. 4 and/or 5 is described. For this embodiment, the steps S406 to S410 in the RBT replacement service subscribing procedure of FIG. 4 have been conducted.

In this embodiment, the first terminating exchanger 32 and the second 33 have received RBT service-related information, which includes the first information on whether RBT is to be replaced or not and the second information informing a route to a corresponding sound storager, when a subscriber's location is registered to the HLR 10 through the first exchanger 32. Therefore, the above-explained steps to be conducted on and after request of a trunk connection to the sound storager 50 can be applied to this embodiment as they are.

In all the above-explained embodiments to providing RBT-replacing service, a subscriber can access the HLR 10 to change the SRBT field of the value-added service parameters that pertains to the RBT service-related information.

For instance, when a subscriber presses a special key on his or her mobile telephone the pressed key information is delivered to the HLR 10 which changes the 2-bit SRBT field based on the key information or alternately. However, more significant bit of the two can not be altered because it indicates whether or not subscribed to the RBT replacement service. Less significant bit can be altered by the above way because it indicates whether the RBT replacement service is activated or not.

Thus, in case of a person having subscribed to RBT replacement service, The SRBT field of the value-added service parameters for that person has a value: of '10' or '11' only where the value '10' is indicative of 'inactive' of the service and '11' indicative of 'active'.

The special key commands change the 'SRBT' field from '10' to '11' or from '11' to '10'. Consequently, a subscriber can determine at will whether to use a conventional RBT or RBT-replacing sound he or she has chosen. If the 'SRBT' field is '10', a terminating exchanger transmits a conventional RBT to a caller even if a called has subscribed to the RBT replacement service.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

The invention claimed is:

1. A method of providing an arbitrary sound as an RBT (RingBack Tone) in a communication network where flexible paging is conducted for a called terminal, comprising: a first step, conducted respectively by both exchangers, of checking whether first information on replacing RBT or not and second information informing a route to a sound providing means has been stored for the called terminal, when an originating exchanger requests a trunk connection to said both exchangers according to a flexible paging procedure, and receiving the first and the second information from an HLR (Home Location Register) after requesting if said information has not been stored, and requesting a trunk connection to the sound providing means while furnishing information identifying the called, based on the already-stored or the received first and the second information; a second step, conducted by the sound providing means, of determining an RBT-replacing sound based on the called-identifying information, and transmitting the determined RBT-replacing sound to the originating exchanger through two paths made respectively by way of said both exchangers; and a third step, conducted by the originating exchanger, of selecting one path of the two, and delivering the determined RBT replacing sound received through the selected path to a caller.

2. The method of claim 1, wherein the originating exchanger selects one path of the two that is connected to one of said both exchangers that responded first to the trunk connection request of the originating exchanger.

3. The method of claim 1, wherein said both exchangers conduct paging of the called terminal individually, and the originating exchanger maintains the trunk connection made to one of said both exchangers whose paging is accepted first by the called terminal and releases remaining trunk connection to the other exchanger.

4. The method of claim 1, wherein each of said both exchangers requests release of the trunk connection made to the sound providing means when a call is answered by the called terminal and the sound providing means releases the trunk connection in response to each of the release requests.

5. The method of claim 1, wherein the sound providing means determines the RBT-replacing sound specified for the called through communication with a storager controller operating based on internet protocol.

6. The method of claim 5, wherein the storager controller changes a sound code of an RBT-replacing sound specified for the called with another code through communication with a web server operating based on internet protocol.

7. The method of claim 6, wherein said another code is a code related with already stored RBT-replacing sound in the sound providing means or is a newly-assigned code for newly stored sound after received from the web server.

8. The method of claim 7, wherein, after being connected to the sound providing means and the storager controller, the web server changes the RBT-replacing sound based on subscriber identifying information entered through an input web page.

9. The method of claim 1, wherein the first information is set based a special key information received from the called terminal.

10. The method of claim 1, wherein the first and the second information are included in a response message to a location registration request message, the response message being sent from the HLR to the call-terminating exchangers.

11. The method of claim 1, wherein the first information is written in a reserve field allocated in value-added service parameters of subscriber's profile.

12. The method of claim 1, wherein a message to request the trunk connection to the sound providing means from both exchangers further includes information identifying the caller.

13. The method of claim 12, wherein the information identifying the called and the caller is telephone numbers of the called and the caller, respectively.

14. A method of processing location registration in an HLR (Home Location Register) to provide an arbitrary sound as an RBT (RingBack Tone) in a communication network where flexible paging is conducted for a called terminal, comprising the steps of: furnishing a first exchanger with first information on whether or not RBT is to be replaced for a terminal and second information informing a route to a sound providing means, when location of the terminal is registered through the first exchanger, and retaining a second exchanger as previous location of the terminal, the second exchanger having served the terminal before; requesting routing information to the first and the second exchanger based on the registered and the retained location information of the terminal when location request for the terminal is received from an originating exchanger, and providing the first and the second information for the second exchanger; and delivering all of routing information received, in response to the routing information request, from the first and the second exchanger to the originating exchanger as a response to the location request.

15. A method of processing location registration in an HLR (Home Location Register) to provide an arbitrary sound as an RBT (RingBack Tone) in a communication network where flexible paging is conducted for a called terminal, comprising the steps of: retaining a second exchanger as previous location of a terminal when location of the terminal is registered through a first exchanger, the second exchanger having served the terminal before; requesting routing information to the first and the second exchanger based on the registered and the retained location information of the terminal when a location request for the terminal is received from an originating exchanger, and providing both of the first and the second exchanger with first information on whether or not an RBT is to be replaced for the terminal and second information informing a route to a sound providing means; and delivering all of routing information received, in response to the routing information request, from the first and the second exchangers to the originating exchanger as a response to the location request.

16. A method of providing an arbitrary sound as an RBT (RingBack Tone) in a communication network where flexible paging is conducted for a called terminal, comprising: a first step, conducted by an HLR (Home Location Register), of furnishing a first exchanger and a second one with first information on whether or not an RBT is to be replaced for a terminal and second information informing a route to a sound providing means, when location of the terminal is registered through the first exchanger, wherein the second exchanger is registered as previous location of the terminal; a second step, conducted respectively by the first and the second exchanger which are individually requested by an originating exchanger to make a trunk connection to the originating exchanger according to a flexible paging procedure, of requesting the sound providing means to make a trunk connection therebetween while furnishing information identifying the terminal, based on the first and the second information furnished from the HLR; a third step, conducted by the sound providing means, of determining an RBT-replacing sound based on the terminal-identifying information, and transmitting the determined RBT-replacing sound to the originating exchanger through two paths made respectively by way of said both exchangers; and a fourth step, conducted by the originating exchanger, of selecting the path of the two, and delivering the determined RBT replacing sound received through the selected path to a subscriber who calls the terminal.

* * * * *